Figure 1:
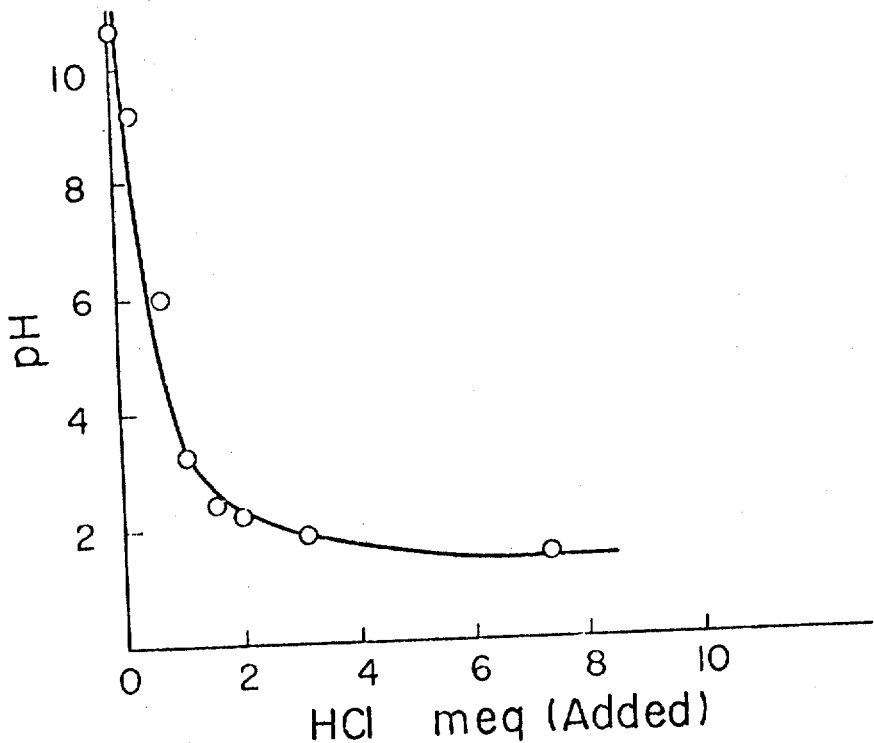

United States Patent [19]

Ito et al.

[11] 3,711,429

[45] Jan. 16, 1973

[54] ARSONIUM AND STIBONIUM ANION EXCHANGERS

[75] Inventors: Takuji Ito, Setagaya-ku, Tokyo; Yoshio Hoshino, Fuchu-shi, Tokyo, both of Japan

[73] Assignee: Tokyo Institute of Technology, Tokyo, Japan

[22] Filed: March 22, 1971

[21] Appl. No.: 126,945

[30] Foreign Application Priority Data

March 27, 1970 Japan...............................45/26383

[52] U.S. Cl..........................260/2.1 E, 260/88.2 C
[51] Int. Cl..............................................C08f 19/20
[58] Field of Search....................................260/2.1 E

[56] References Cited

FOREIGN PATENTS OR APPLICATIONS 201,637    9/1967    U.S.S.R.

OTHER PUBLICATIONS

Trostyanskaya et al., J. Polym. Sci. 59, 378–87 387 (1962).

Trostyanskaya et al., Zh. Prikl. Khim. 39, 1754–1760 (1966).

Trostyanskay et al., Vysokomolegul. Soedin. 5, 325–329 (1963).

Kim, Daehan Hwahak Hwoejee 14, 37–43 (1970).

Primary Examiner—Melvin Goldstein
Attorney—Burgess, Ryan & Wayne

[57]  ABSTRACT

Anion exchangers characterized by superior and unique properties are provided which are polystyrene-divinylbenzene copolymers having an exchange group in the molecule, the exchange group being an "$-CH_2X^+R$" group (wherein X is an As or Sb atom, and R is a methyl group).

3 Claims, No Drawings

ARSONIUM AND STIBONIUM ANION EXCHANGERS

BACKGROUND OF THE INVENTION

There are well known quaternary ammonium-type anion exchangers which are polystyrene-divinylbenzene copolymers having an exchange group in the molecule thereof, said exchange group being the following group:

$$-CH_2N^+R_3$$

wherein R is a methyl group or a hydroxyethyl group. Said polystyrene-divinylbenzene copolymer is a polystyrene resin containing divinylbenzene as a cross linking agent and having generally a degree of cross linking of from 4 to 8 percent. Such polystyrene-divinylbenzene copolymers may be synthesized by a conventional method.

The above-mentioned anion exchangers are sold by Dow Chemical Co. (United States of America) under the trademarks e.g. "Dowex 1," or "Dowex 2" or "Dowex 3."

For example, "Dowex 1-X4" is a strongly basic anion exchanger which is a polystyrene-divinylbenzene copolymer having 4 percent of a degree of cross linking with divinylbenzene and an exchange group of "$-CH_2N^+R_3$" in the molecule (R being methyl group). The properties of anion exchangers are generally compared in ion-exchange capacity (meq/g), distribution coefficient (Kd), separation factor ($\alpha$) and selectivity coefficient ($K^x$).

These terms are defined in "C.B. Amphlett, Inorganic Ion Exchangers, Elsevier, Amsterdam, 1964."

Anion exchangers having a preferred separation factor which is adequate for separating one anion from others in a mixture of various anions, and possessing a unique selectivity coefficient were desired.

It is, therefore, an object of the present invention to provide anion exchangers having such desirable and superior properties.

We have found that the novel anion exchanger having the aforesaid desirable superior properties can be obtained by replacing the nitrogen atom with an arsenic atom or antimony atom in the exchange group of the polystyrene-divinylbenzene copolymer.

The present invention is based on this discovery.

SUMMARY OF THE INVENTION

The present invention relates to novel anion exchangers and to a process of preparing such anion exchangers.

The novel anion exchangers of this invention are polystyrene-divinylbenzene copolymers having an exchange group in the molecule thereof, said exchange group being an "$-CH_2X^+R_3$" group (wherein X is an arsenic or antimony atom, and R is a methyl group).

The anion exchangers of the present invention have the following formula:

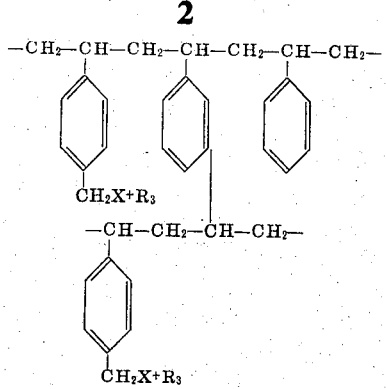

wherein X is an arsenic or antimony atom and R is a methyl group.

The novel anion exchangers of this invention are characterized in that they have the above-mentioned exchange group in the molecule in place of the exchange group of "Dowex 1-X4" as apparent from the above-mentioned formula, the exchange group of the novel anion exchangers of the present invention contain an arsenic (As) or antimony (Sb) atom therein in place of the nitrogen (N) atom in the exchange group of "Dowex 1-X4" anion exchange resin.

In this specification, the anion exchangers containing said As or Sb atom in the exchange group are, hereinafter, referred to as "arsonium-type anion exchangers" or "stibonium-type anion exchangers," respectively.

The process for synthesizing the anion exchanger of this invention comprises the steps of adding a non-polar solvent to a chloromethylated polystyrene-divinylbenzene copolymer, adding a polar solvent to the resulting solution and then adding thereto a solution of trimethylarsine or trimethylstibine in ether, allowing the chloromethylated polystyrene-divinylbenzene copolymer to react with trimethylarsine or trimethylstibine under reflux at a temperature of from 35° to 45°C, and removing the aforesaid solvents from the reaction product.

Suitable non-polar solvents include benzene, carbon tetrachloride or hexane, and suitable polar solvents include dichloromethane, trichloromethane or ethylidene chloride.

Preferred embodiments of the process for synthesizing the anion exchangers of this invention are set out in the following examples which are to be considered as illustrative and not limiting.

EXAMPLE 1

Synthesis of the Arsonium-type Anion Exchanger

20cc of benzene and 20cc of dichloromethane were added to 15g of chloromethylated polystyrene-divinylbenzene copolymer which has been made by a conventional method, and to this was added 200cc of a solution containing 1.5 mol of trimethylarsine in one liter of ether. The resulting mixture was stirred at a temperature of from 35° to 45°C under reflux for 2 days.

The reaction product was washed with acetone, ethyl alcohol and water in turn. 18.8g of the arsonium-type anion exchanger were obtained. The anion exchanger thus obtained had an ion-exchange capacity of 1.54 meq/g.

EXAMPLE 2

Syntheses of the Stibonium-type Anion Exchanger

20cc of benzene and 20cc of dichloromethane were added to 15g of chloromethylated polystyrene-divinylbenzene copolymer which has been made by a conventional method, and to this was added 200meq/g. of a solution containing 1.5 mol of trimethylstibine in 1 liter of ether. The resulting mixture was stirred at a temperature of from 35° to 45°C under reflux for 2 days.

The reaction product was washed in turn with acetone, ethyl alcohol and water. 19.5g of the stibonium-type anion exchanger were obtained. The anion exchanger thus obtained had an ion-exchange capacity of 1.31 meg/g.

The properties of the arsonium-type or stibonium-type anion exchangers of this invention obtained as above will be compared with those of the conventional anion exchanger such as "Dowex 1-X4."

Figure 2:
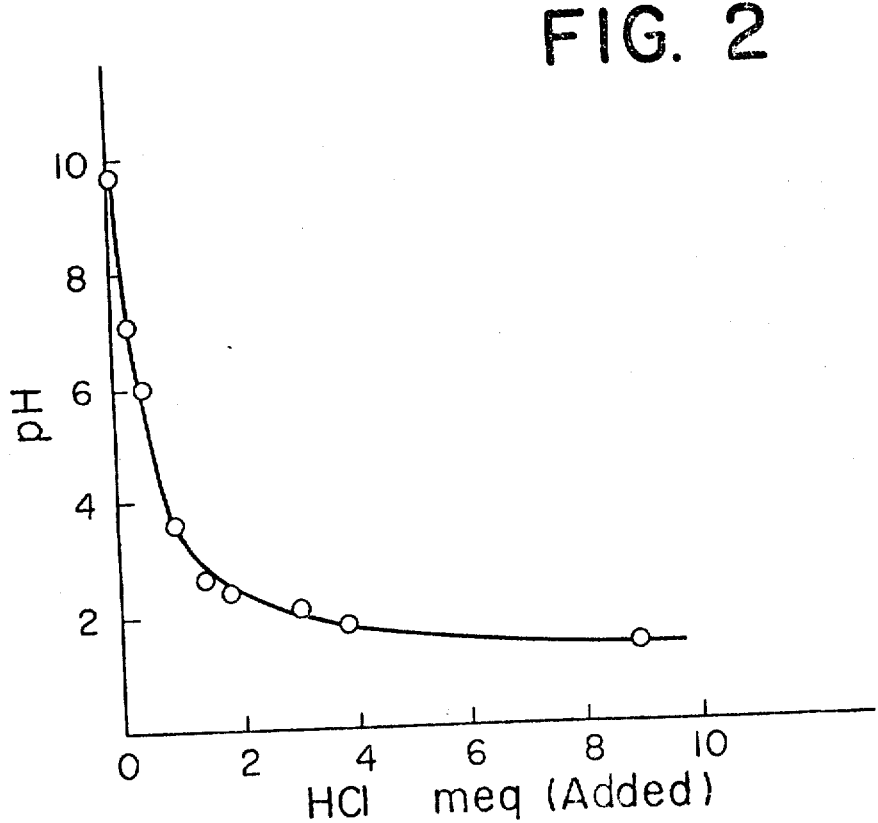

The properties of "Dowex 1-X4," the Arsonium-type exchanger and the Stibonium-type exchanger are shown in the tables 1 and 2 below and the accompanying drawings, in which FIG. 1 and FIG. 2 are titration curves of the arsonium-type anion exchanger and the stibonium-type anion exchanger, respectively.

From FIG. 1 and FIG. 2, it will be understood that the arsonium-type and the stibonium-type anion exchanger of this invention are strongly basic.

Distribution coefficient (Kd) and separation factor ($\alpha$) of the anion exchangers ($NO_3$-form) to several anions ($Cl^-$, $Br^-$, $I^-$ and $SCN^-$) are shown in the table 1 below.

TABLE 1

|  | Dowex 1-X4 anion exchanger | | Arsonium-type anion exchanger | | Stibonium-type anion exchanger | |
|---|---|---|---|---|---|---|
|  | Kd | $\alpha$ | (Kd) | $\alpha$ | Kd | $\alpha$ |
| $Cl^-$ | 31 | | 19 | | 6.1 | |
|  | | 2.5 | | 4.2 | | 2.3 |
| $Br^-$ | 79 | | 80 | | 14 | |
|  | | 4.4 | | 6.3 | | 7.9 |
| $I^-$ | 351 | | 505 | | 110 | |
|  | | 1.8 | | 2.4 | | 2.7 |
| $SCN^-$ | 615 | | 1210 | | 297 | |

Conditions of measurement:
1 $NO_3$-form anion exchanger: 0.4g
2 Concentration of $Cl^-$, $Br^-$, $I^-$ or $SCN^-$: $1.6\times10^{-3}$meq
3 Said ingredients (1) and (2) are added to 0.1N $KNO_3$-solution to prepare a solution of 25.0cc.
4 Temperature: 25°C
5 Standing time for ion exchanging: 20 hours
6 Color reagent: A mixture of dil-$HNO_3$, an aqueous solution of potassium iron sulfate and an alcoholic solution of mercury thiocyanate
7 Wave length for measurement: 460 m$\mu$
8 Measuring apparatus: Spectrophotometer sold by Hitachi Seisakusho (Japan) under "Type EPU-2A"

As is evident from the above-mentioned data, the arsonium-type and the stibonium-type anion exchangers of this invention have a significantly higher ability of separation than that exhibited by "Dowex 1-X4."

The orders of the selectivity coefficients ($K^xCl$) of various anions vs. chloride ion with the anion exchangers are shown in table 2 below.

TABLE 2

| $K^xCl$ | Dowex 1-X4 anion exchanger | Arsonium-type anion exchanger | Stibonium-type anion exchanger |
|---|---|---|---|
| small | $CH_3COO^-$ | $IO_3^-$ | $IO_3^-$ |
| ↑ | $IO_3^-$ | $H_2PO_4^-$ | $H_2PO_4^-$ |
|  | $H_2PO_4^-$ | $CH_3COO^-$ | $CH_3COO^-$ |
|  | $Cl^-$ | $NaSO_4^-$ | $Cl^-$ |
|  | $KCO_3^-$ | $KCO_3^-$ | $NaSO_4^-$ |
|  | $ClO_3^-$ | $Cl^-$ | $KCO_3^-$ |
|  | $NO_3^-$ | $ClO_3^-$ | $ClO_3^-$ |
| ↓ | $NaSO_4^-$ | $NO_3^-$ | $NO_3^-$ |
| large | $ClO_4^-$ | $ClO_4^-$ | $ClO_4^-$ |

Temperature: 25°C

As is evident from table 2 each of the arsonium-type and the stibonium-type anion exchangers clearly exhibit a different selectivity from that of "Dowex 1-X4."

It is clear from the above-mentioned results of the comparison tests that the arsonium-type and the stibonium-type anion exchangers of the invention have superior and unique properties in comparison with a conventional quaternary ammonium-type anion exchanger such as "Dowex 1-X4."

We claim:

1. An anion exchanger which is polystyrene-divinylbenzene copolymer having an exchange group in the molecule thereof, characterized in that said exchange group is a group having the following general formula:

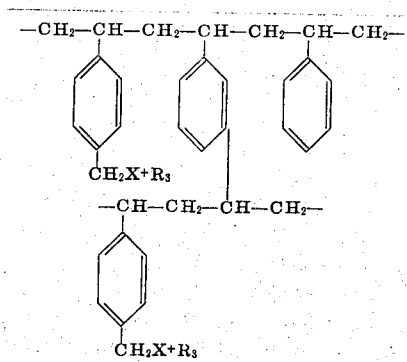

wherein X is an arsenic or antimony atom, and R is a methyl group.

2. An anion exchanger according to claim 1 wherein X is an arsenic atom.

3. An anion exchanger according to claim 1 wherein X is an antimony atom.

* * * * *

UNITED STATES PATENT OFFICE
CERTIFICATE OF CORRECTION

Patent No. 3,711,429     Dated January 16, 1973

Inventor(s) Takuji Ito, et al

It is certified that error appears in the above-identified patent and that said Letters Patent are hereby corrected as shown below:

Column 3, lines 51-52 "1.6 X 10⁻ 3meq" should read -- $1.6 \times 10^{-3}$ meq --.

Insert the attached sheet as part of the Letters Patent 3,711,429.

Signed and sealed this 20th day of August 1974.

(SEAL)
Attest:

McCOY M. GIBSON, JR.
Attesting Officer

C. MARSHALL DANN
Commissioner of Patents